July 31, 1956   A. A. SCHMITZ   2,757,014
MANUALLY OPERATED HYDRAULIC STEERING MECHANISM
Filed Feb. 27, 1953   2 Sheets-Sheet 1
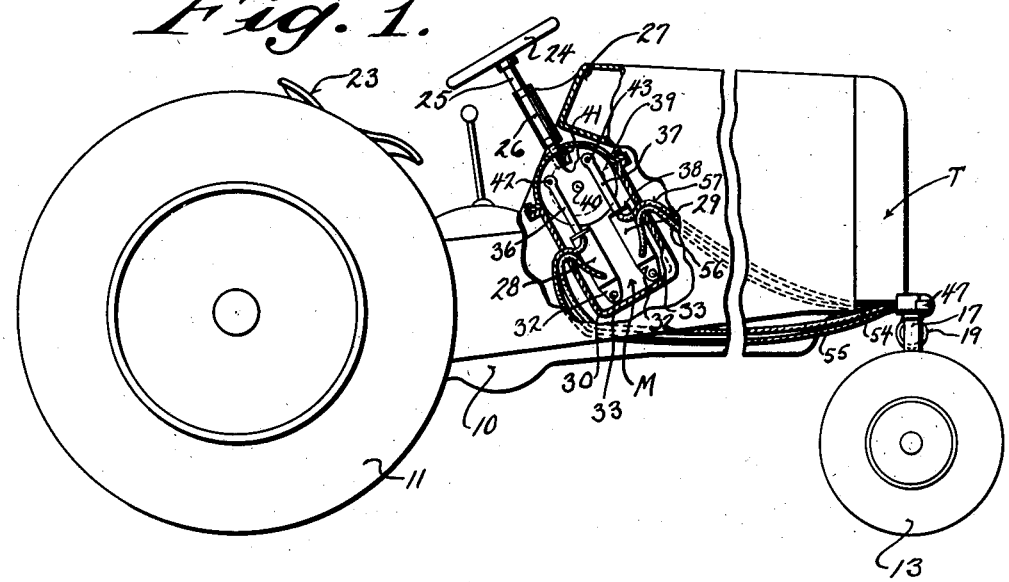
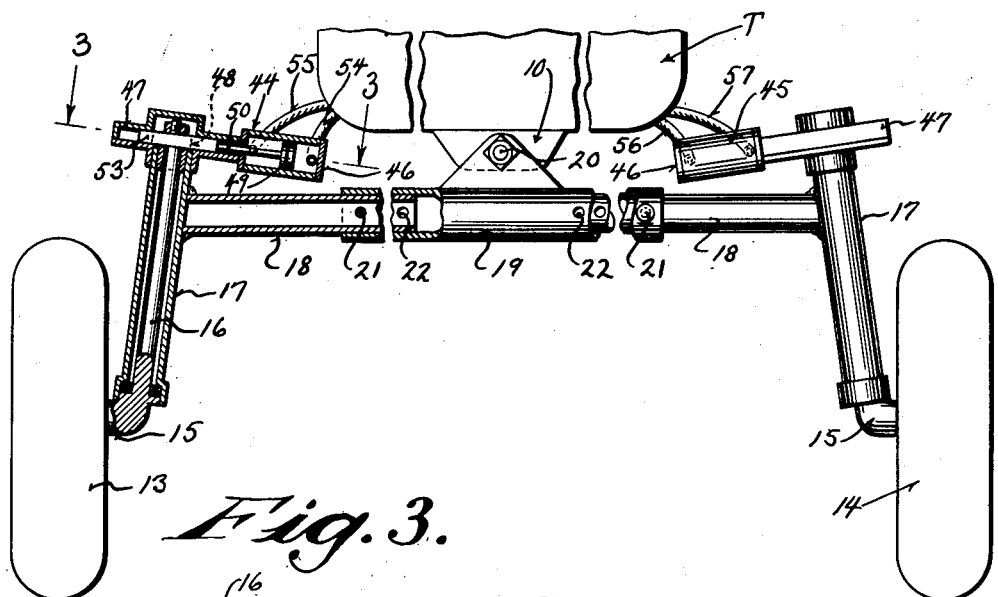
INVENTOR
ALBERT A. SCHMITZ
BY
ATTORNEYS July 31, 1956  A. A. SCHMITZ  2,757,014
MANUALLY OPERATED HYDRAULIC STEERING MECHANISM
Filed Feb. 27, 1953  2 Sheets-Sheet 2
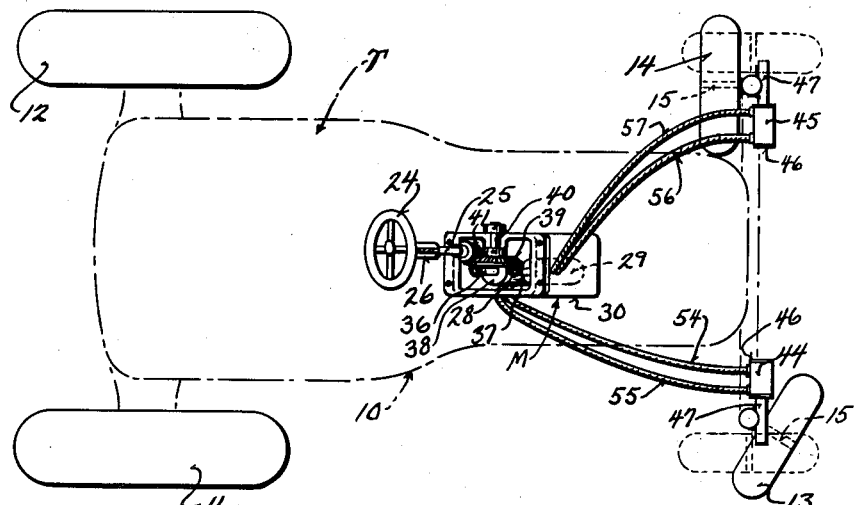
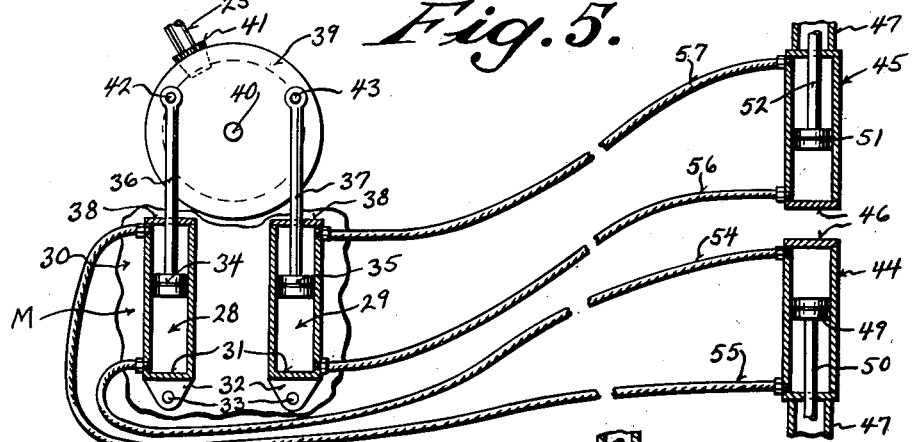
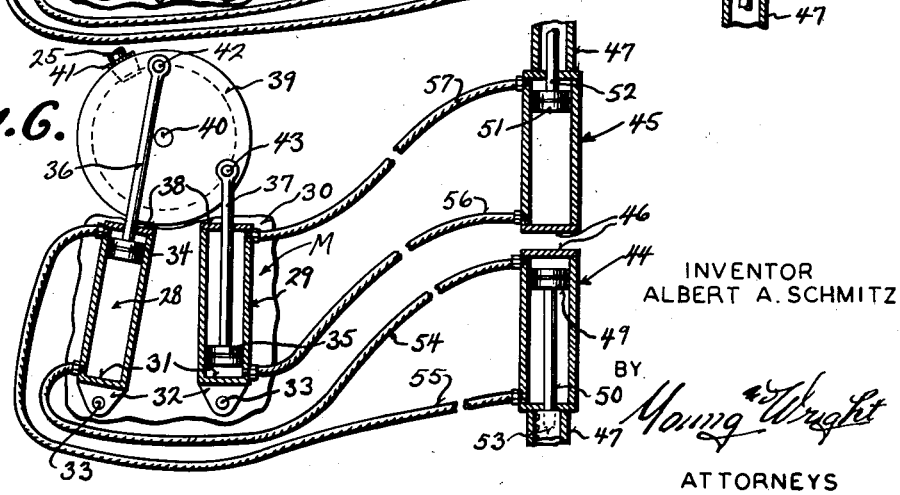
INVENTOR
ALBERT A. SCHMITZ
BY
ATTORNEYS United States Patent Office 2,757,014
Patented July 31, 1956

2,757,014

MANUALLY OPERATED HYDRAULIC STEERING MECHANISM

Albert A. Schmitz, Racine, Wis.

Application February 27, 1953, Serial No. 339,407

1 Claim. (Cl. 280—87)

This invention appertains broadly to vehicle steering mechanisms, and more particularly to a hydraulic steering gear for tractors and the like.

One of the primary objects of my invention is to provide an improved steering mechanism so-designed that a tractor or similar vehicle can be turned around in an extremely small radius, and substantially in its own length, rendering the tractor particularly suitable for plowing and the like, where the turning at the end of a row in a small space is highly desirable.

Another salient object of my invention is to provide means whereby upon the turning of the steering wheel of a tractor, a differential of movement will be had in the front steering ground wheels of the tractor, so that one front wheel (on the side in the direction of turning) will be disposed at right angles to the longitudinal axis of the tractor, and the other front ground wheel will be at an angle of substantially 50 degrees to the longitudinal axis of the tractor, to bring about pivoting or turning of the tractor on the rear drive wheel disposed on the side of the tractor in the direction of turning.

A further object of the invention is to provide a hydraulic steering gear designed to bring about a differential of turning movement of the two front wheels of a tractor embodying a control cylinder for each front wheel, with means between the steering wheel and the control cylinders for imparting a greater distance of travel to the piston of one control cylinder than the other, whereby to give a greater distance of travel to the piston of one operating cylinder than the other.

A still further object of the invention is to provide novel means for mounting the operating cylinders on the front axle in such a manner that the active length of the front axle can be easily and quickly adjusted to dispose the front wheels different distances apart to suit varying operating conditions.

With these and other objects in view, the invention consists in the novel construction, arrangement and formation of parts as will be hereinafter more specifically described and claimed, and illustrated in the accompanying drawings, in which one preferred embodiment of my invention is shown, and in which Figure 1 is a side elevational view of a tractor equipped with my invention, parts of the figure being shown broken away and in section to illustrate structural detail.

Figure 2 is an enlarged front fragmentary elevational view of a tractor equipped with the steering mechanism, parts of the figure being shown broken away and in section.

Figure 3 is a longitudinal sectional view through one of the control cylinders and associate parts taken on the line 3—3 of Figure 2, looking in the direction of the arrows, the figure being taken on a larger scale than Figure 2.

Figure 4 is a diagrammatic top plan view illustrating the position of the front wheels of a tractor for turning in a short radius in a counterclockwise direction and showing the front wheels in dotted lines for traveling in a straight path.

Figure 5 is a diagrammatic view, with parts broken away and in section illustrating the position of the control cylinders relative to the operating cylinders and the connection between the steering post and the pistons of the control cylinders, all of the parts being shown in position for travel in a straight path.

Figure 6 is a view similar to Figure 5 but showing the parts in position for making a turn in a small radius in a counter-clockwise direction.

Referring to the drawings in detail, wherein similar reference characters designate corresponding parts throughout the several views, the letter T generally indicates a tractor and M my improved steering mechanism therefor.

The tractor T is of a type now in common use and will not be described in detail, but the same includes a frame 10 on which is mounted the rear ground wheels 11 and 12 and the front ground wheels 13 and 14. The front ground wheels 13 and 14 are rotatably mounted on axle spindles 15 and these spindles in turn are formed on the lower ends of spindle shafts 16. The shafts 16 are mounted for turning movement in housings 17 which are securely welded, or otherwise fastened, to the outer ends of outer front axle sections 18. The outer axle sections 18 are slidably mounted within an intermediate axle section 19 and the intermediate axle section 19 is fastened, as at 20, to the frame 10 of the tractor. The outer axle sections 18 are held in an adjusted position on the central axle section 19, in any desired way, such as by bolts 21, which can be fitted in selected mating openings 22 formed in the central axle section 19 and the outer axle sections 18.

The other parts of the tractor will not be described, but it is to be noted that the tractor is provided with a driver's seat 23, disposed adjacent to the steering wheel 24. The steering wheel 24 is secured to the steering post 25, which is rotatably mounted in a bracket 26 carried by the cowl 27 of the tractor. The steering post 25 extends inward of the cowl and is treated in a certain fashion as will be later described.

The improved steering mechanism M includes a pair of control cylinders 28 and 29 and these cylinders, if so desired, can be mounted within a suitable casing 30 rigidly fastened to the tractor below the cowl 27, or in any other appropriate place. The lower end of each cylinder 28 and 29 is closed by a cylinder head 31 and each cylinder head carries a pivot ear 32, which is mounted for swinging movement on a pin 33 carried by the casing 30. Slidably mounted within the cylinders 28 and 29 are pistons 34 and 35 carrying piston rods 36 and 37 and these piston rods slidably extend through upper cylinder heads 38 which close the upper ends of the cylinders 28 and 29.

The piston rods 36 and 37, are operatively connected to the steering post 25 in a novel manner, to bring about a different distance of travel of the piston rods according to the direction of turning of the steering post, and in Figures 5 and 6 I have illustrated one form of mechanism for accomplishing this purpose, and it is to be understood that I do not wish to limit myself to the exact arrangement shown. As illustrated, this mechanism includes a beveled gear wheel 39 rotatably supported on a shaft 40. This shaft in turn is mounted in the housing 30. The lower end of the steering post 25 has keyed, or otherwise secured thereto, a beveled pinion 41, which meshes with the beveled gear 39, so that upon the turning of the steering wheel 24, the wheel 39 will be rotated therewith. The upper end of the piston rod 36 is rockably mounted on a crank pin 42 carried by the gear wheel 39, and the piston rod 37 is rockably mounted on a similar crank pin 43 carried by the gear wheel 39. Both pins 42 and 43 are eccentric to the shaft 40 and are normally located in the same horizontal plane and above the shaft 40.

From the description so far, it can be seen that upon rotation of the gear wheel 39 in a clockwise direction, the piston rod 37 will be pushed downwardly and the piston rod 36 will be raised. As a substantially straight downward push is given to the piston rod 37, this rod and its piston 35 will travel a greater distance downward in the cylinder 29 than the movement upward of the rod 36 and the piston 34 in its cylinder 28. This is due to the fact that the movement of the pin 42 is partly lateral to the piston rod 36 and hence imparts less longitudinal movement to it. It is to be also noted that in the arrangement shown, the pistons 34 and 35 are located above the transverse centers of their cylinders and that the pistons can travel a greater distance downward in their cylinders than they can upward. As the piston 35 is traveling a greater distance in its cylinder upon a downward stroke, a greater volume of liquid will be forced out of the cylinder 29 than out of the cylinder 28 on the upstroke of piston 34 (see Figure 6). Obviously, when the gear wheel 39 is rotated in a counter-clockwise direction, the rod 36 and the piston 34 will be forced down and the rod 37 and the piston 35 will be raised.

In order to bring about the turning of the wheels 13 and 14, I provide an operating cylinder 44 for the wheel 13 and a like operating cylinder 45 for the wheel 14. These operating cylinders can be mounted in various manners on the tractors T, either above or below the front axle and in the form shown (see Figure 2), I have shown the operating cylinders mounted above the front axle. The opposite ends of the cylinders 44 and 45 are closed by cylinder heads 46 and the outer cylinder heads have rigidly secured thereto outwardly extending guide housings 47 which are rigidly secured to the upper ends of the sleeves 17. The upper ends of the wheel spindle shafts 16 extend into the housings and have keyed, or otherwise secured thereto, spur pinions 48, the purpose of which will later appear. Slidably mounted within the cylinder 44 is a piston 49 having secured thereto the outwardly extending piston rod 50. Slidably mounted within the cylinder 45 is a similar piston 51, and secured to this piston is a piston rod 52 which extends out of the outer cylinder head. The piston rods 50 and 52 slidably extend into the guide housings 47 and have secured thereto rack bars 53 which are guided in the housings 47 for sliding movement, and the spur pinions 48 mesh with the rack bars 53. Consequently, upon movement of the rack bars the wheel spindle shafts 16 will be turned in their sleeves for steering the tractor.

By referring to Figure 5, it can be seen that normally the pistons 49 and 51 are located closer to the inner cylinder heads 46 than the outer cylinder heads, and that these pistons can travel a greater distance toward the outer cylinder heads than the inner cylinder heads.

I preferably operatively connect the control cylinders 28 and 29 with the operating cylinders 44 and 45 by a closed hydraulic circuit, but obviously means can be provided for introducing additional hydraulic liquid into the system at desired times, and expansion chambers can be provided, if desired.

Now referring to the connections between the cylinders 28 and 44 and the cylinder 29 with the cylinder 45, it can be seen by examining Figures 5 and 6 that the lower end of the cylinder 28 has connection with the inner end of the cylinder 44 by a flexible conduit or tube 54 and that the upper end of the cylinder 28 has communication with the outer end of the cylinder 44 by a flexible conduit or tube 55. The lower end of the cylinder 29 has communication with the inner end of the cylinder 45 by means of a flexible conduit or pipe 56 and the upper end of the cylinder 29 has communication with the outer end of the cylinder 45 by means of a flexible conduit or pipe 57.

Considering that the system is filled with hydraulic liquid and a turn is desired to be made to the left or in a counter-clockwise direction (see Figure 4), then the steering wheel 24 is turned in a counter-clockwise direction and the gear wheel 39 will be turned in a clockwise direction. The piston 35 will be forced down toward the lower end of its cylinder and the hydraulic liquid will be forced into the inner end of the cylinder 45 moving the piston 51 to the outer end of the cylinder 45. This movement is sufficient to slide the rack bar 53 of piston 51, a sufficient distance to rotate the wheel 14 of the tractor at right angles to the longitudinal axis of the tractor, and as the piston 35 moves down liquid will be sucked from the outer end of the cylinder 45. At the same time, the piston 34 has moved up in its cylinder 28, forcing liquid above the piston 34 into the outer end of the cylinder 44, moving the piston 49 inward in its cylinder 44, a less distance than the movement of the piston 51 in its cylinder 45, and this movement of the piston 49 slides the rack bar attached to the rod 50, an exact distance to turn the wheel 13 of the tractor at an angle of substantially 50 degrees to the longitudinal axis of the tractor. At the time of the turning of the steering wheel 24, the operator of the tractor is actuating his brake pedals in such a manner as to hold the rear ground wheel 12 against rotation and the tractor will make a short turn, swinging or pivoting on the rear ground wheel 12.

Upon the turning of the steering wheel 24 to the right or in a clockwise direction, an exact reverse movement of the front wheel 13 and 14 will be had.

With my improved steering mechanism, the tractor can be effectively guided straight down a row and any slight steering movement of the wheel 24 will be transmitted to the wheels 13 and 14 equally, in that, initial movement of the rods 36 and 37 is substantially equal.

It is to be noted that the pistons 44 and 45 and the guide casings 47 are carried by the sleeves 17 for the wheel spindle shafts 16; consequently, adjustment of the outer axle sections 18 will not interfere with my steering mechanism and the flexible conduits or pipes 54, 55, 56 and 57 permit inward and outward movement of the cylinders 44 and 45 during adjustment of the length of the axle.

Changes in details may be made without departing from the spirit or the scope of this invention, but what I claim as new is:

In a tractor of the type including a steering post, a front axle having inward and outward adjustable axle sections, front ground wheels, spindles for said wheels, bearing sleeves on said axle sections, spindle shafts rotatably mounted in the sleeves, an operating cylinder carried by each sleeve, a piston in each operating cylinder, means operatively connecting one piston with one spindle shaft and means connecting the piston of the other operating cylinder with the other spindle shaft, a control wheel located adjacent to the steering post for turning movement, means interconnecting the steering post and control wheel so that the latter may be turned by the post, an independent control cylinder for each operating cylinder, fluid connections between each control cylinder and its respective operating cylinder, pistons in the control cylinders, and an operative connection between the pistons of the control cylinders and control wheel including, a beveled gear formed on the outer periphery of said control wheel and a gear on said steering post meshing with said beveled gear, and a pair of piston rods each connected at one end to said control wheel and at its other end to a respective piston, whereby turning movement of said control wheel imparts a greater movement to one piston than the other during the turning of the post in each direction.

(References on following page)

References Cited in the file of this patent

UNITED STATES PATENTS

| | | | |
|---|---|---|---|
| 1,610,580 | Nickolson | Dec. 14, | 1926 |
| 1,615,075 | Francis | Jan. 18, | 1927 |
| 1,806,136 | Weiss | May 19, | 1931 |
| 2,178,073 | Hardy | Oct. 31, | 1939 |
| 2,192,175 | Ballard | Mar. 5, | 1940 |
| 2,229,394 | Stinne | Jan. 21, | 1941 |
| 2,274,821 | Bloxsom | Mar. 3, | 1942 |
| 2,387,006 | Buchanan | Oct. 16, | 1945 |
| 2,567,074 | Kupiec | Sept. 4, | 1951 |

FOREIGN PATENTS

| 839,712 | France | Apr. 11, 1939 |
|---|---|---|